No. 887,888. PATENTED MAY 19, 1908.
M. WOLF.
CARRIAGE CUSHIONING DEVICE.
APPLICATION FILED MAY 18, 1907.
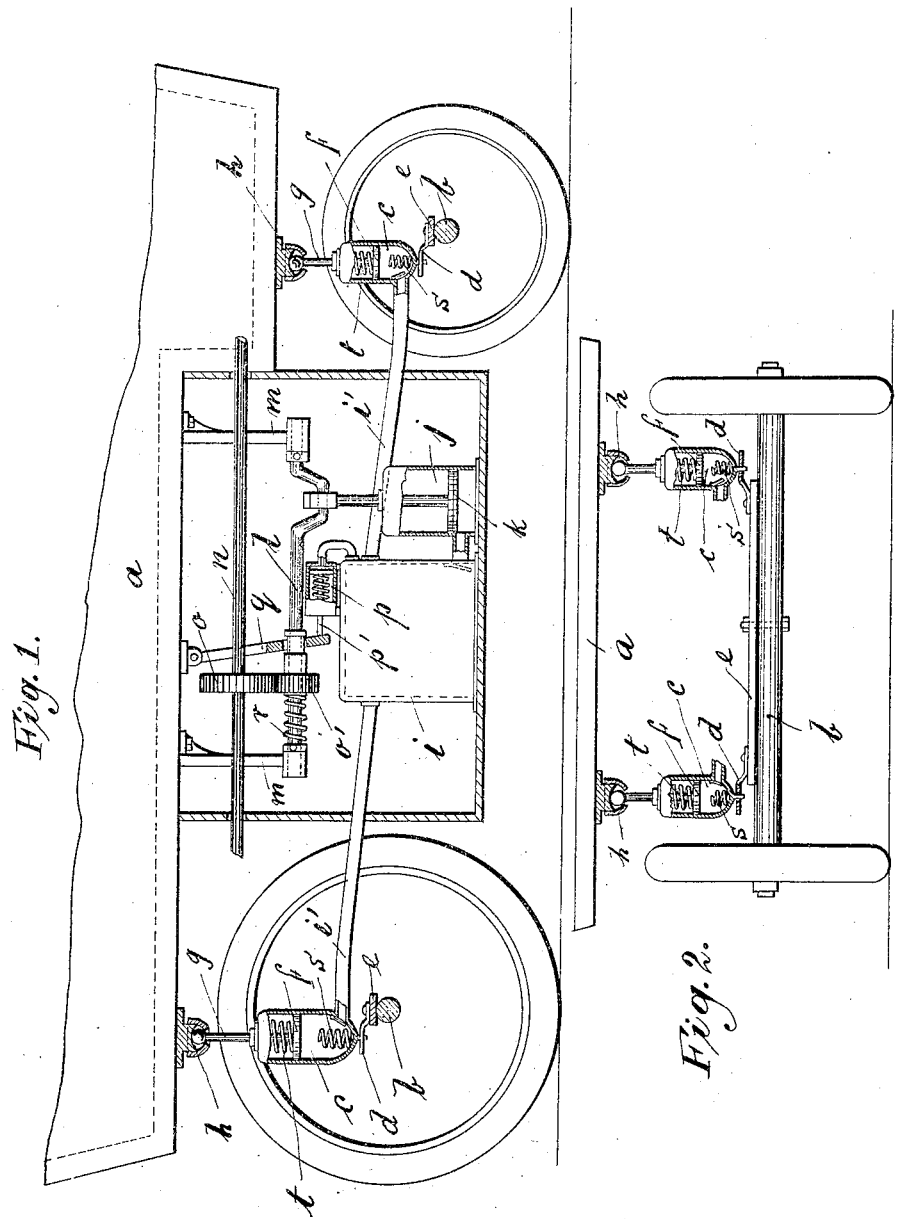
WITNESSES
Geo Schwarz
Johanne Daumberger
INVENTOR
Melanie Wolf
BY
ATTORNEY

UNITED STATES PATENT OFFICE.

MELANIE WOLF, OF NEW YORK, N. Y.

CARRIAGE-CUSHIONING DEVICE.

No. 887,888.

Specification of Letters Patent.

Patented May 19, 1908.

Application filed May 18, 1907. Serial No. 374,373.

*To all whom it may concern:*

Be it known that I, MELANIE WOLF, subject of the Emperor of Austria-Hungary, and a resident of New York, county and State of New York, have invented certain new and useful Improvements in Carriage-Cushioning Devices, of which the following is a specification.

The present invention pertains to cushioning devices for all sorts of vehicles, particularly motor vehicles, and has for its object to provide a construction that will allow greater resiliency and thus be much more capable of absorbing shocks, and be more durable than the hitherto used springs.

To carry out my invention, I arrange air cushions which support the underframe of the vehicle and which are supplied with compressed air, raised by a suitable apparatus connected with the motor shaft. Owing to this construction, and because of the fact that the underframe is not in rigid connection with the axles of the vehicle, the vibrations will be greatly reduced.

My invention also consists in the arrangement, construction and combination of parts which will hereinafter be fully specified.

To make my invention more clear, the same is illustrated in the accompanying drawing, in which similar reference letters denote corresponding parts and in which Figure 1 is a diagrammatic elevation, and Fig. 2 a front elevation of my invention.

$a$ denotes the underframe of the vehicle, $b, b$ the axles thereof.

$c, c$ denote vertical air cylinders, one pair being arranged for each end of the vehicle. Each air cylinder is secured on a spring plate $d$ that projects laterally from a bar $e$ centrally pivoted to the axle $b$. Working in the cylinder $c$ is a piston $f$, the piston rod $g$ of which projects through the upper end of said cylinder and is connected, preferably by means of a universal joint $h$, with the underframe of the vehicle. The compressed air is supplied to said air cylinders by pipes $i'$ leading from a compressed air receptacle $i$, arranged underneath the underframe $a$ between the two axles $b, b$. To raise compressed air into said receptacles, I provide an air pump $j$ that may be of the ordinary construction, and that communicates with the compressed air receptacle. The pump piston $k$ is operated from a crank shaft $l$ suitably supported in brackets $m, m$ projecting from the underframe and adapted to be driven from the motor shaft $n$ by means of gears $o, o'$ of which gear $o$ is secured on the motor shaft and gear $o'$ is slidably borne on the crank shaft $l$.

To control the supply of air to the air cylinders, I provide the air receptacle with a safety valve $p$, which at a certain pressure will disconnect the gears $o, o'$ whereupon the air pump will be stopped. For this purpose, the valve rod $p'$ is adapted to operate a swinging lever $q$ that projects down from the underframe and engages the slidable gear $o'$. A spring $r$ acting on the said gear $o'$ tends to throw the latter into meshing connection with gear $o$.

Sudden shocks, in cases where the air pressure sinks below or rises beyond a certain limit, can be prevented by springs $s$ arranged at the bottom of each cylinder and springs $t$ respectively on the opposite end thereof.

I do not wish to restrict myself to the particular construction and arrangement shown, but

What I claim and desire to secure by Letters Patent is:

1. In a motor vehicle, the combination with a motor, of a cushioning device comprising compressed air cylinders, spring plates secured to the axles of the vehicle and supporting said air cylinders, spring actuated pistons working in said air cylinders, and universal joints connecting the piston rods with the underframe of the vehicle, a compressed air receptacle communicating with the said air cylinders, an air pump supplying compressed air to said receptacle, a crank shaft to be operated from the motor and driving the air pump, and means to at a certain pressure automatically disconnect the air pump from the motor, substantially as set forth.

2. In a motor vehicle, the combination with a motor, of a cushioning device comprising compressed air cylinders supported on the axles of the vehicle, spring actuated pistons working therein and connected with the underframe of the vehicle, a compressed air receptacle communicating with said cylinders, an air pump supplying compressed air to said receptacle, a crank shaft supported from the underframe of the vehicle, gears transmitting movement from the motor to the said crank shaft, a safety valve on the compressed air receptacle adapted at a certain pressure to disconnect the crank shaft from the motor, substantially as set forth.

Signed at New York this 17 day of May 1907.

MELANIE WOLF.

Witnesses:
  DAVID WOLF,
  JOSEPH E. CAVANAUGH.